(12) United States Patent
Audo et al.

(10) Patent No.: US 7,140,633 B2
(45) Date of Patent: Nov. 28, 2006

(54) FIFTH WHEEL MOUNTING AND CROSS MEMBER ASSEMBLY

(75) Inventors: Mark M. Audo, Muskegon, MI (US); David R. Pernesky, Holland, MI (US); Steven C. Dupay, Holland, MI (US); Michael H. Ginocchio, Grand Haven, MI (US); Gerald W. Hungerink, Holland, MI (US)

(73) Assignee: The Holland Group, Inc., Holland, MI (US)

( * ) Notice: Subject to any disclaimer, the term of this patent is extended or adjusted under 35 U.S.C. 154(b) by 0 days.

(21) Appl. No.: 11/045,882

(22) Filed: Jan. 28, 2005

(65) Prior Publication Data

US 2005/0167944 A1    Aug. 4, 2005

Related U.S. Application Data

(60) Provisional application No. 60/552,005, filed on Mar. 10, 2004, provisional application No. 60/540,123, filed on Jan. 29, 2004.

(51) Int. Cl.
    *B62D 53/06* (2006.01)
(52) U.S. Cl. ............... 280/438.1; 280/423.1; 280/433; 280/441.1
(58) Field of Classification Search ............. 280/423.1, 280/433, 438.1, 441.1
    See application file for complete search history.

(56) References Cited

U.S. PATENT DOCUMENTS

| 2,402,254 | A | * | 6/1946 | Maddock et al. | ........ 280/438.1 |
| 3,729,214 | A | * | 4/1973 | Mulcahy et al. | ............ 280/407 |
| 4,443,025 | A | * | 4/1984 | Martin et al. | ................ 280/407 |
| 4,762,334 | A | * | 8/1988 | Altherr | ........................ 280/433 |
| 5,368,324 | A | * | 11/1994 | Kaim | ....................... 280/438.1 |
| 5,639,106 | A | * | 6/1997 | Vitale et al. | ................ 280/407 |
| 6,729,635 | B1 | * | 5/2004 | Gallego et al. | .......... 280/438.1 |
| 2003/0001361 | A1 | * | 1/2003 | Laarman et al. | ............ 280/433 |
| 2003/0025296 | A1 | * | 2/2003 | Babin | ....................... 280/438.1 |
| 2003/0047907 | A1 | * | 3/2003 | Hicks et al. | ............. 280/438.1 |
| 2004/0021290 | A1 | * | 2/2004 | Hicks et al. | ............. 280/438.1 |

FOREIGN PATENT DOCUMENTS

EP     000481928 A1 *  4/1992

* cited by examiner

*Primary Examiner*—Lesley D. Morris
*Assistant Examiner*—Marc A. Scharich
(74) *Attorney, Agent, or Firm*—Prince, Heneveld, Cooper, DeWitt & Litton, LLP

(57) ABSTRACT

A fifth wheel mounting assembly for mounting a fifth wheel hitch plate to a frame of a tractor that includes a pair of first support members adapted to be fixedly coupled to a pair of rails of a tractor, and each having a plurality of first apertures, and a pair of first mounting brackets each including a plurality of apertures that receive mounting hardware therein, wherein the mounting hardware extends through the plurality of apertures of the first mounting bracket and through the plurality of first apertures of the support members, thereby fixedly coupling the mounting brackets with the support members. Each mounting bracket further includes an inwardly exposed aperture adapted to receive a mounting pin therein for pivotally coupling a fifth wheel hitch plate to the mounting brackets, and a recess. The fifth wheel mounting assembly further includes a structural cross member having ends received within the recesses of the mounting brackets, thereby torsionally coupling the pairs of support members and mounting brackets with one another.

34 Claims, 9 Drawing Sheets

US 7,140,633 B2

FIFTH WHEEL MOUNTING AND CROSS MEMBER ASSEMBLY

CROSS-REFERENCE TO RELATED APPLICATIONS

The present application claims priority from U.S. Provisional Patent Application No. 60/540,123, filed Jan. 29, 2004, entitled FIFTH WHEEL MOUNTING AND CROSS MEMBER ASSEMBLY, and U.S. Provisional Patent Application No. 60/552,005, filed Mar. 10, 2004, entitled FIFTH WHEEL MOUNTING AND CROSS MEMBER ASSEMBLY.

BACKGROUND OF THE INVENTION

The present invention relates to a fifth wheel coupling assembly, and in particular to a novel mounting and cross member assembly for coupling a fifth wheel hitch plate to an associated vehicle.

Fifth wheel coupling systems are used in wide variety of applications for coupling heavy duty trailers to associated tractors, as well as for coupling recreational vehicles with associated towing vehicles. FIG. 1 illustrates a typical prior construction of a tractor frame and a fifth wheel mounting system 10 for tractor/trailer applications. As illustrated, the tractor frame and mounting system 10 includes a pair of parallel frame rails 12 spaced apart and that support a suspension 14, a drive train (not shown) and a fifth wheel coupling apparatus 16 for connecting a trailer to the tractor. While the frame rails 12 are illustrated as ending under a deck 17 it should be noted that the rails 12 continue forwardly of the deck 17 and extend under a cab of the tractor and support the cab and an engine of the tractor.

The coupling apparatus 16 includes a fifth wheel hitch 20 and a mounting bracket and base plate assembly 18 configured to connect the fifth wheel hitch 20 to the frame rails 12. The mounting bracket and base plate assembly 18 includes a pair of brackets 22 connected to ends of a base plate 24. The base plate 24 is constructed of a planar sheet of steel that includes a pair of mounting brackets 26 extending upwardly from a top surface of the base plate 24. As illustrated, the mounting brackets 26 are fixedly welded to the base plate 24, while the base plate 24 is fixedly welded to the brackets 22. The coupling apparatus 16 is connected to the frame rails 12 by placing ends of the base plate 24 over the top surface of the frame rails 12 and by inserting fasteners (not shown) through the brackets 22 and into the frame rails 12. Therefore, the brackets 22 assist in connecting the coupling apparatus 16 to the frame rails 12 of the tractor. Each mounting bracket 26 of the mounting bracket and the base plate assembly 18 includes an elongated aperture 28 therein configured to accept conventional attachment structure (not shown) for connecting the fifth wheel hitch 20 to the base plate 24.

The fifth wheel hitch 20 is configured to accept a pin of a tractor trailer to connect the trailer to the tractor. Since the fifth wheel hitch 20 accepts the pin within a center opening 30, the primary load of the trailer rests on the top surface of the fifth wheel hitch 20. As a result, the primary load of the trailer is on the mounting bracket and the base plate 24 at the center of the base plate 24. The load from the trailer is transferred to the attachment points of the mounting bracket and base plate assembly 18 to the frame rails 12 through heavy ribs and other structure that act as a beam.

As illustrated, the fifth wheel hitch 20 (FIG. 2) includes a hitch plate 11 defining the throat 30 for receiving a kingpin (not shown). The hitch plate 11 has a bottom face 15, back ribs 27 that extend from the bottom base 15, a peripheral flange 19 that extends from a periphery of the bottom face 15 and is connected to ends of the back ribs 27, and a main rib 21 that extends from the bottom face 15 between the back ribs 27 and a portion of the peripheral flange 19, with the main rib 21 being connected at ends 23 to the peripheral flange 19. A pair of skirts 29 extend from the hitch plate 11 adjacent the back rib 27 and define a tapered mouth leading to the throat 30. A pair of skirt ribs 33 are positioned on the skirts 29. A mounting rib 35 is located inwardly of the peripheral flange 19 on each side of the throat 30. The mounting brackets 26 are connected to the fifth wheel hitch 20 by inserting the mounting brackets into a space 37 between the mounting rib 35 and the peripheral flange 19. A mounting pin (not shown) is inserted through the aligned apertures in the peripheral flange 19 and the mounting rib 13 to connect the fifth wheel hitch 20 to the mounting brackets 26 and the associated tractor.

The prior construction of the tractor frame and fifth wheel mounting system 10, as detailed above, requires a welded connection between the mounting brackets 26 and the base plate 24 as well as a welded connection between the base plate 24 and the brackets 22, thereby adding to the constructions costs associated with the assembly of the mounting system.

Further, the structural rigidity as provided by the base plate 24 extending between the mounting brackets 26 remains relatively constant as the base plate 24 extends entirely under the mounting brackets 26. Moreover, the prior constructions of the tractor frame and fifth wheel mounting systems allow forces developed during operation of the associated vehicle to degrade ride and control characteristics. Specifically, as illustrated in FIGS. 3–6, forces exerted on the vehicle frame may cause misalignment and/or deformation of the frame, including "racking" (FIG. 3), "bowing out" (FIG. 4), "bowing in" (FIG. 5), and "twisting" (FIG. 6).

Accordingly, a fifth wheel and mounting assembly providing decreased construction and assembly costs, while simultaneously providing a variable and dynamic structural rigidity is desired.

SUMMARY OF THE INVENTION

One aspect of the present invention is to provide a fifth wheel assembly for mounting a fifth wheel hitch plate to a frame of a tractor, wherein the fifth wheel mounting assembly includes a first support member adapted to be fixedly coupled to a first rail of a tractor, and having a plurality of first apertures, and a second support member adapted to be fixedly coupled to a second rail of a tractor, and having a plurality of first apertures. The fifth wheel mounting assembly also includes a first mounting bracket including a plurality of apertures that receive mounting hardware therein, the mounting hardware extending through the plurality of apertures of the first mounting bracket also extending through the plurality of first apertures of the first support member, thereby fixedly coupling the first mounting member with the first support member, and wherein the first mounting bracket further includes an inwardly-exposed aperture adapted to receive a mounting pin therein for pivotally coupling a fifth wheel hitch plate to the first mounting bracket and a recess. The fifth wheel mounting assembly further includes a second mounting bracket including a plurality of apertures that receive mounting hardware therein, the mounting hardware extending through the plurality of apertures of the second mounting bracket also extending through the plurality of first apertures of the second support member, thereby fixedly coupling the second mounting bracket with the second support member. The second mounting bracket further including an inwardly-exposed aperture adapted to receive a mounting pin therein for pivotally coupling a fifth wheel hitch plate to the second mounting bracket, and a recess. The fifth wheel mounting assembly further includes a structural cross member having a first end received within the recess of the first mounting bracket and the second end received with the recess of the second mounting bracket, thereby torsionally coupling the first support member and the first mounting bracket with the second support member and the second mounting bracket.

Another aspect of the present invention is to provide a fifth wheel hitch assembly for coupling a trailer to a tractor, wherein the fifth wheel hitch assembly includes a hitch plate defining a throat adapted to receive a kingpin, and including a pair of mounting apertures, at least one mounting pin received within the mounting apertures of the hitch plate, and a fifth wheel mounting assembly. The fifth wheel mounting assembly includes a first support member adapted to be fixedly coupled to a first rail member of a tractor, and a plurality of first apertures, and a second support member adapted to be fixedly coupled to a second rail of a tractor, and a plurality of first apertures. The fifth wheel mounting assembly also includes a first mounting bracket including a plurality of apertures that receive mounting hardware therein, wherein the mounting hardware extending through the plurality of apertures of the first mounting bracket also extends through the plurality of first apertures of the first support member, thereby fixedly coupling the first mounting bracket with the first support member. The first mounting bracket further includes an inwardly exposed aperture receiving the at least one mounting pin therein, thereby pivotally coupling the fifth wheel hitch plate to the first mounting bracket, and a recess. The fifth wheel mounting assembly further includes a second mounting bracket including a plurality of apertures that receive mounting hardware therein, wherein the mounting hardware extending through the plurality of apertures of the first mounting bracket also extends through the plurality of first apertures of the second support bracket, thereby fixedly coupling the second mounting bracket with the second support member. The second mounting bracket further including an inwardly-exposed aperture receiving the at least one mounting pin therein, thereby pivotally coupling the fifth wheel hitch plate to the second mounting bracket, and a recess. The fifth wheel mounting assembly further includes a structural cross member having a first end received within the recess of the first mounting bracket, and a second end received within the recess of the second mounting bracket, thereby torsionally coupling the first support member and the first mounting bracket with the second support member and the second mounting bracket.

The present inventive fifth wheel mounting and cross member assembly provides for a relative decrease in construction and assembly costs, while simultaneously providing a variable and dynamic structural rigidity, may be quickly and easily assembled and coupled with an associated vehicle, is capable of a long operating life, and is particularly well adapted for the proposed use.

These and other advantages of the invention will be further understood and appreciated by those skilled in the art by reference to the following written specification, and appended drawings.

DETAILED DESCRIPTION OF THE PREFERRED EMBODIMENTS

Figure 3:
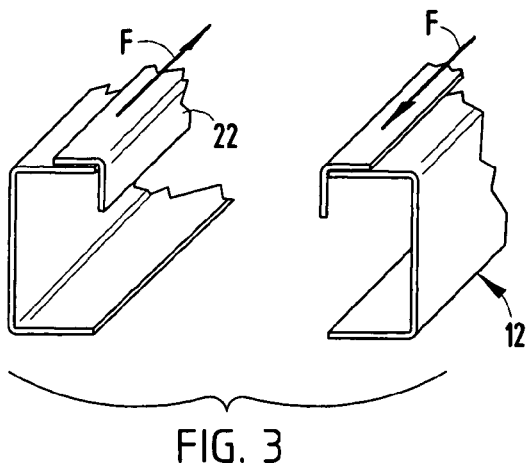
FIG. 3 is a perspective view of a pair of rails of the tractor frame and racking forces acting thereon.
Figure 4:
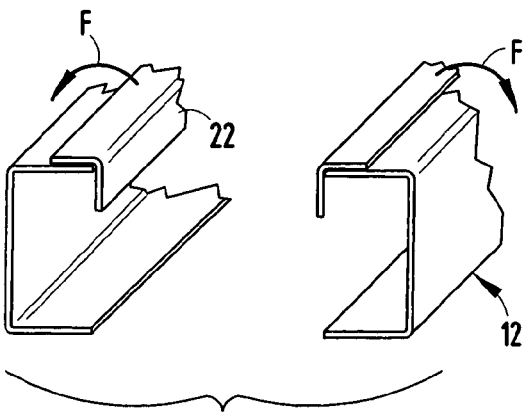
FIG. 4 is a perspective view of a pair of rails of the tractor frame and bowing out forces acting thereon.
Figure 5:
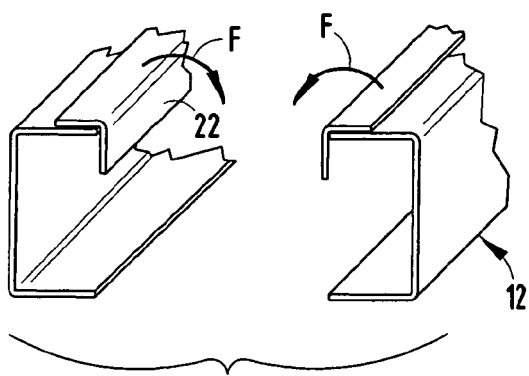
FIG. 5 is a perspective view of a pair of rails of the tractor frame and bowing in forces acting thereon.
Figure 6:
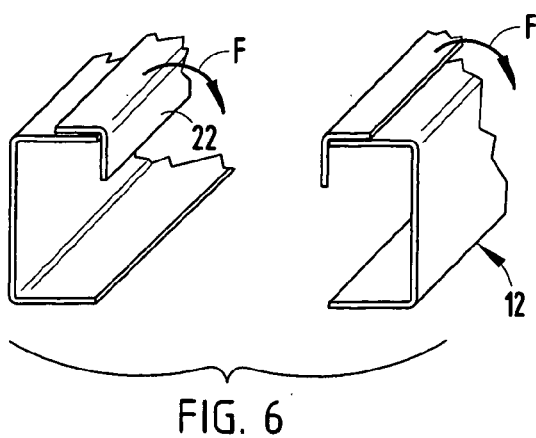
FIG. 6 is a perspective view of a pair of rails of the tractor frame and twisting forces acting thereon.

For purposes of description herein, the terms "upper," "lower," "right," "left," "rear," "front," "vertical," "horizontal," and derivatives thereof shall relate to the invention as oriented in FIG. 3. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 40 (FIG. 7) generally designates a fifth wheel mounting assembly embodying the present invention. In the illustrated example, the fifth wheel mounting assembly 40 includes a pair of support members 42, a pair of mounting brackets 44 affixed to the support members 42, and a structural cross member 46 extending between the pairings of the support members 42 and the mounting brackets 44.

Figure 1:
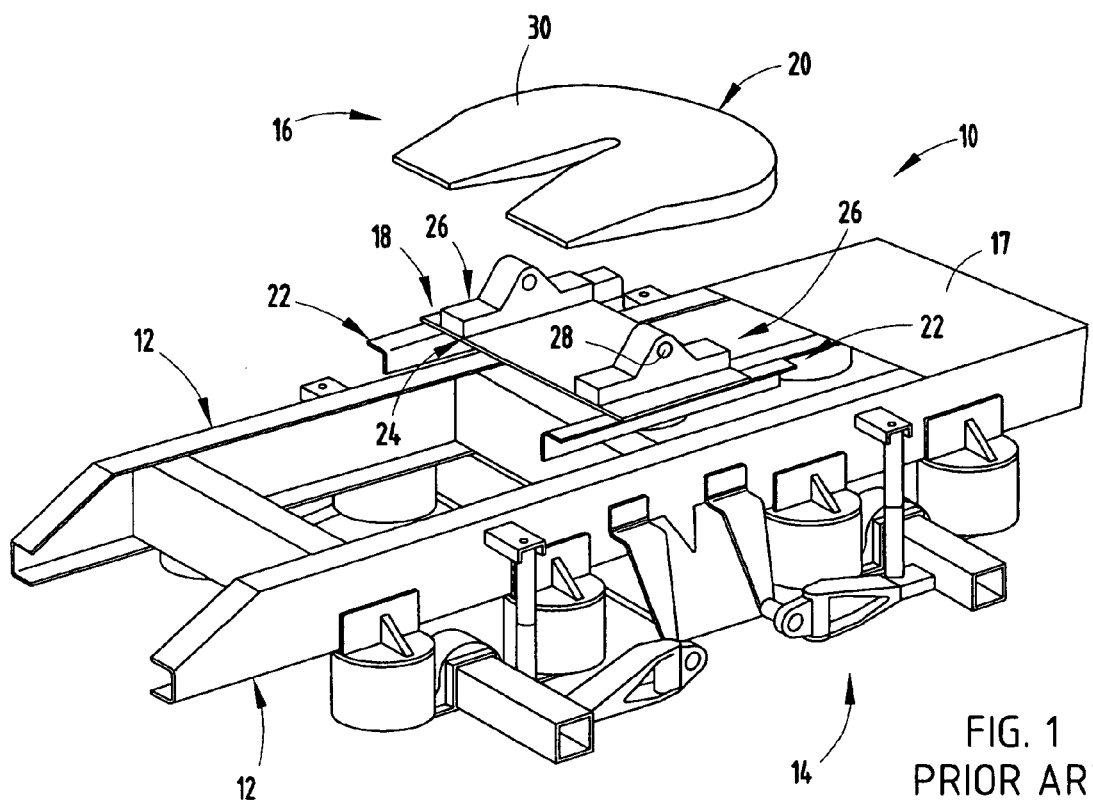
FIG. 1 is a perspective view of a prior construction of a tractor frame and fifth wheel coupling system.
Figure 2:
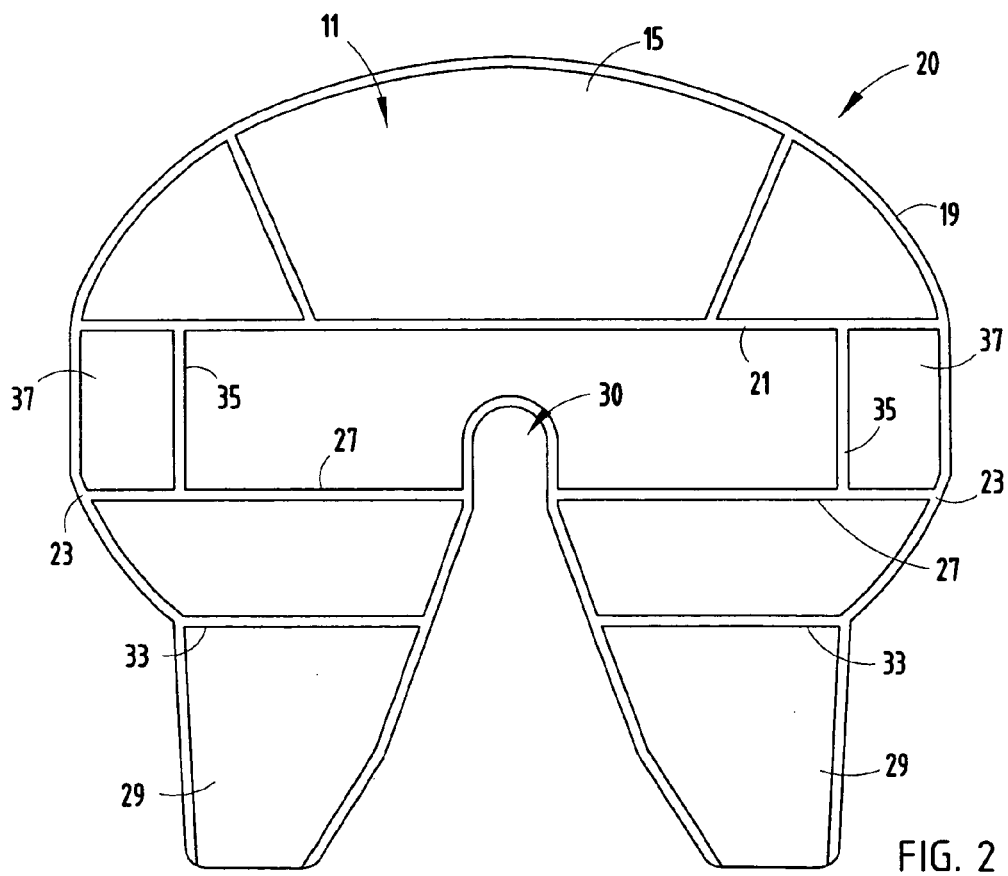
FIG. 2 is a bottom view of a prior construction of a fifth wheel hitch plate.

Each elongated support member 42 is provided with an oppositely-oriented inverted L-shaped cross-sectional profile including a vertically-oriented sidewall 48, a horizontally-oriented top wall 50 integrally formed with and extending perpendicularly outward from the associated sidewall 48, and a downwardly curved lip portion 52 integrally formed with the top wall 50 and extending outwardly therefrom. Each support member 42 is configured so as to mate with an associated frame rail, such as the frame rails illustrated in FIG. 1. Each support member 42 includes a plurality of apertures 54 located along the length thereof. In assembly, mounting hardware, such as bolts (not shown), extend through the apertures 54 of each of the support members 42 and are received within other apertures (not shown) located along the length and extending through the frame rails of the associated tractor, thereby fixedly securing the support members 42 to the tractor frame rails.

Each mounting bracket 44 (FIGS. 8–11) is provided with a wing-shaped profile having a vertically oriented planar body portion 56, a centrally-located and cylindrically-shaped sleeve 58 fixedly attached to the body portion 56 and including a central aperture or bore 60, and a horizontally-oriented top wall 62 extending outwardly from the sleeve 58 in both directions along the length of the body portion 56. Each mounting bracket 44 also includes a mounting wall 64 that extends perpendicularly outwardly from the associated body portion 56 proximate a bottom surface 66. The mounting wall 64 includes a plurality of apertures 68 spaced along the length thereof and sized so as to receive mounting hardware such as bolts 70, as described below. A plurality of structural support members 72 extend vertically along the body portion 56 between the top wall 62 and the mounting wall 64, thereby structurally reinforcing the mounting bracket 44 against torsional twisting. Each mounting bracket 44 also includes an inner wall 74 extending perpendicularly inward from the body portion 56 and located proximate the bottom surface 66. The inner wall 74 includes an inwardly-extending arm 75 having a hardware-receiving aperture 77 extending therethough. A pair of outwardly located inner support members 76 extend vertically along the body portion 56 between the top wall 62 and the bottom surface 66, while a pair of outer support members 78 extend vertically along the body portion 56 between the top wall 62 and the inner wall 74. A central support member 80 extends vertically along the body portion 56 between the sleeve 58 and the mounting wall 64 as well as the inner wall 74. The inner support members 76, the outer support members 78 and the central support member 80 each serve to structurally rigidify or stiffen the associated mounting bracket 44 from torsional twisting. The mounting wall 64 and the inner wall 74 each shaped to define a downwardly-exposed recess 82. In the illustrated example, the recess 82 is provided with hat-shaped cross-sectional profile to match the cross-sectional profile of the cross member 46, as described below.

The elongated cross member 46 is formed of a single piece and is corrugated so as to increase the structural rigidity thereof. In the illustrated example, the cross member 46 is provided with a hat-shaped cross-sectional configuration having a raising central portion 81 and a pair of longitudinally-extending leg portions 83, thereby strengthening the cross member 46 against bending and torsional deformation. The cross member 46 includes apertures 84 located at opposite ends of the cross member 46 and laterally spaced thereacross, and centrally located apertures 85.

Figure 7:
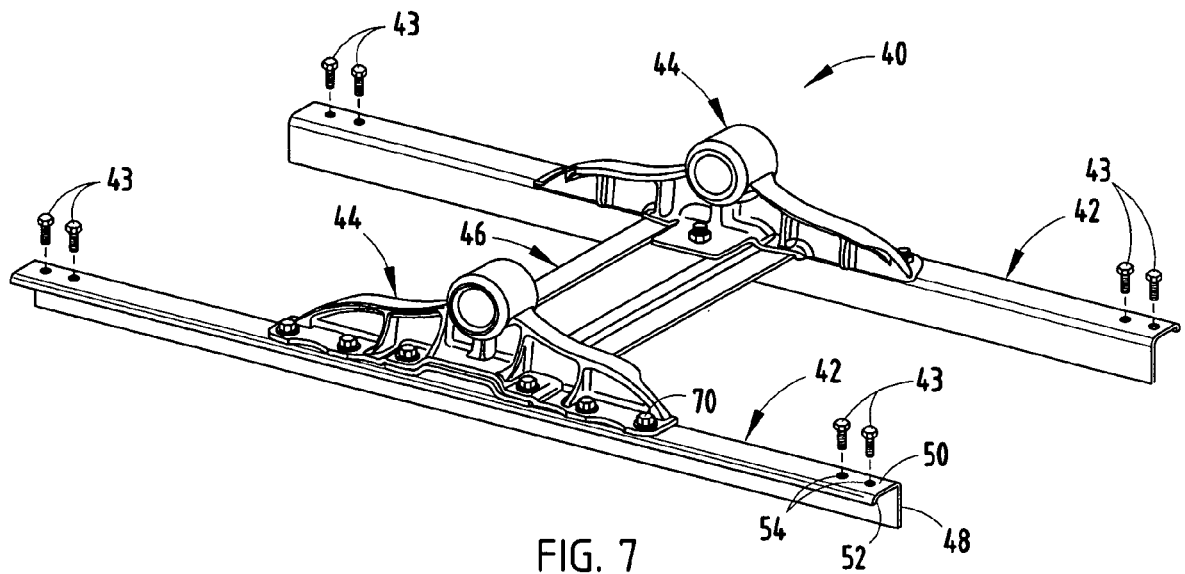
FIG. 7 is a top perspective view of a fifth wheel mounting assembly embodying the present invention.
Figure 8:
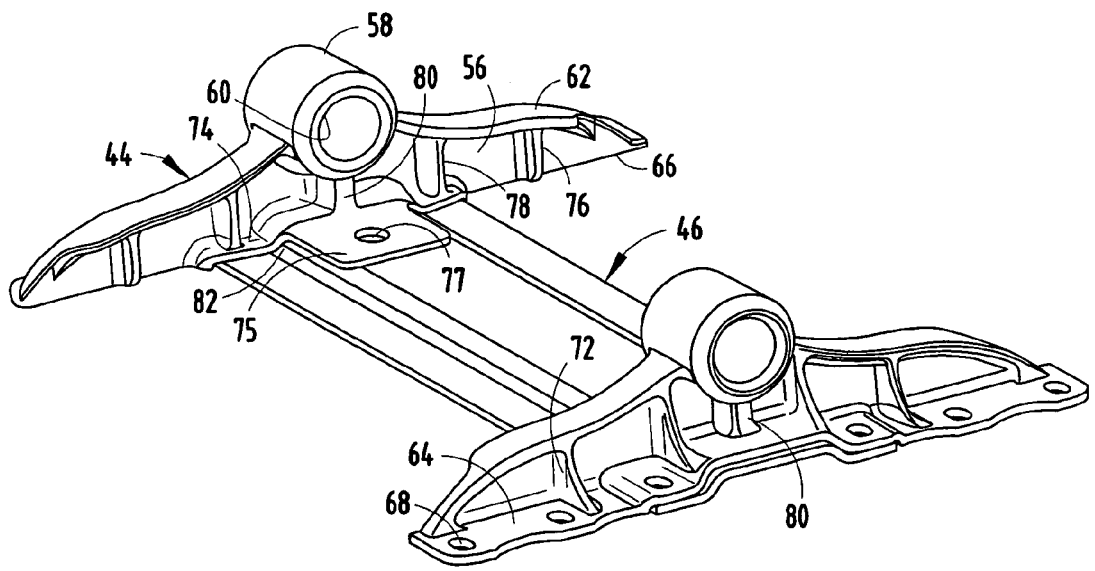
FIG. 8 is a top perspective view of a pair of mounting brackets and a cross member of the fifth wheel mounting assembly.
Figure 9:
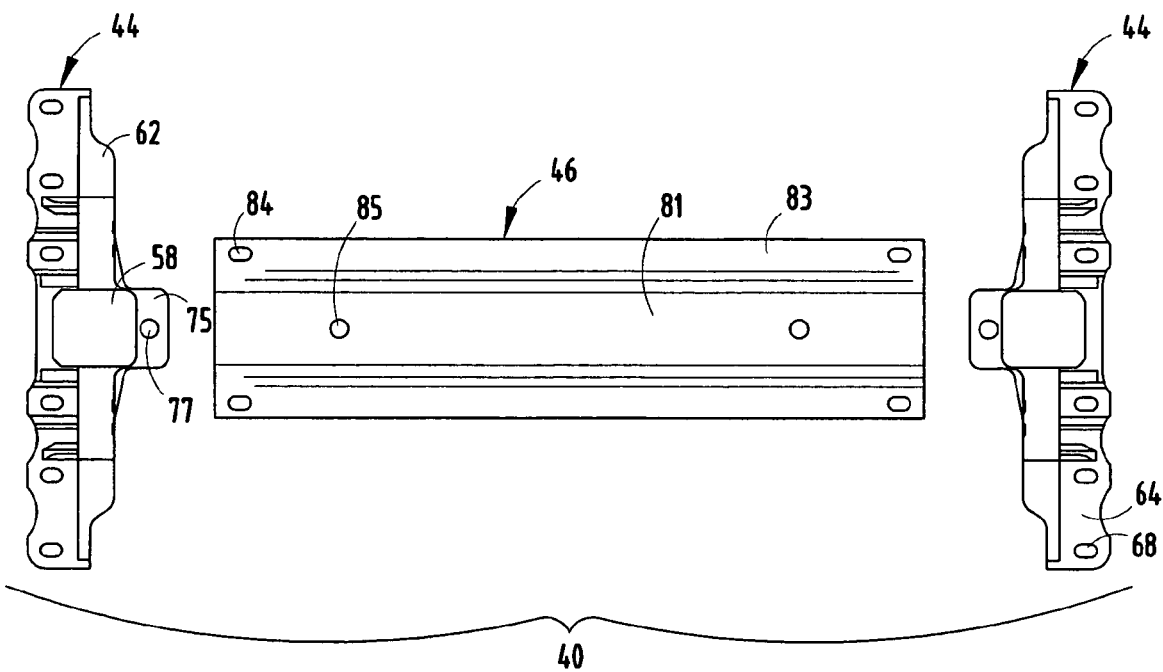
FIG. 9 is an exploded top plan view of the mounting brackets and the cross member of the fifth wheel mounting assembly.
Figure 10:
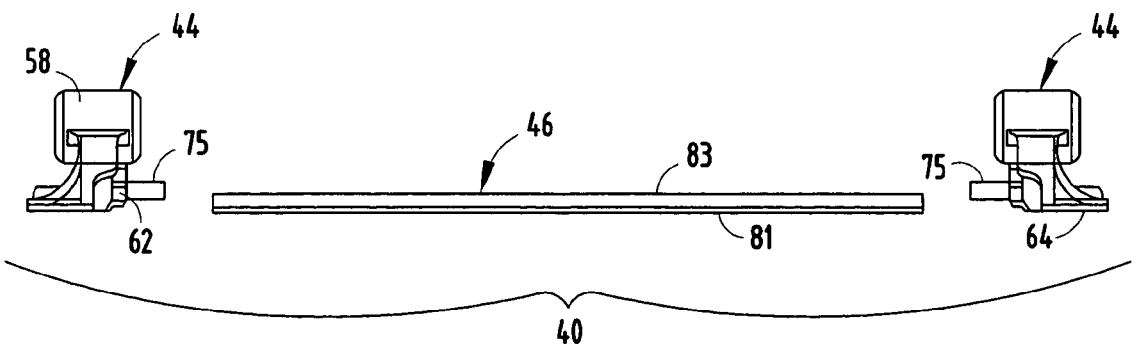
FIG. 10 is an exploded side view of the mounting brackets and the cross member of the fifth wheel mounting assembly.
Figure 11:
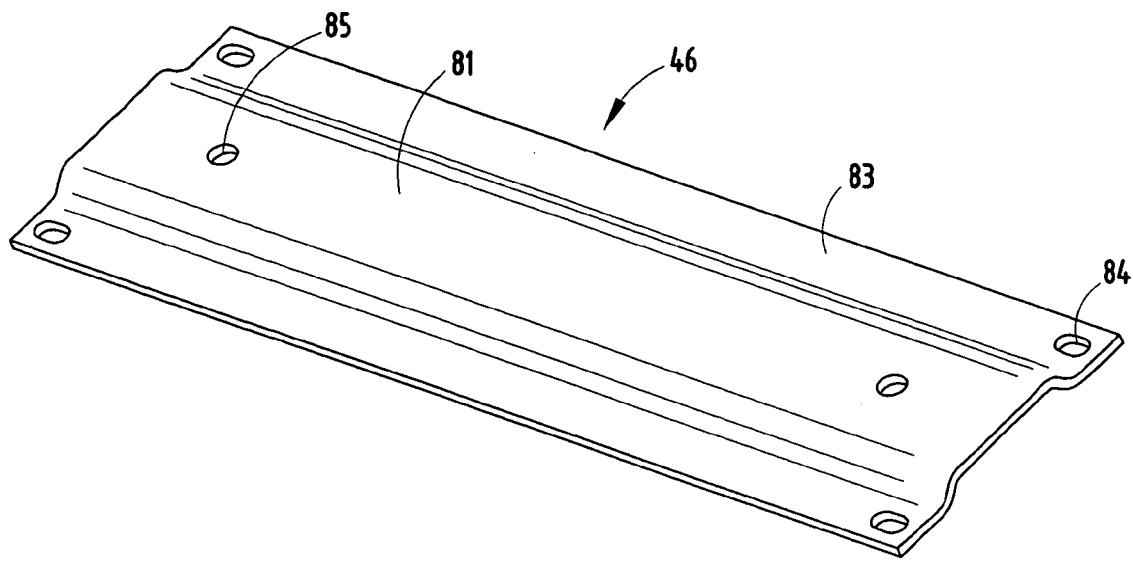
FIG. 11 is a top perspective view of a first embodiment of the cross member.

In assembly, as best illustrated in FIGS. 7 and 8, the mounting brackets 44 are located with respect to the cross member 46 such that each end of the cross member 46 is located within the recess 82 of the associated mounting bracket 44, the apertures 84 of the cross member 46 align with apertures 68 of the mounting brackets 44, and the apertures 85 of the cross member 46 is aligned with the aperture 77 of he mounting brackets 44. The mounting brackets 44 and the cross member 46 are then positioned with respect to the support members 42 such that the apertures 68 of the mounting brackets 44 are aligned with apertures (not shown) located within the top wall 50 of the support members 42, thereby allowing the bolts 70 to be placed within the apertures 68 and the apertures of the support members 42 and securely affixing the mounting brackets 44 and the cross member 46 to the support members 42. The support members 42 are subsequently affixed to the rail members of the tractor by extending bolts (43) through the apertures 54 of the support members 42 and into aligned apertures (not shown) of the tractor rails. It should be noted that the illustrated configuration allows differing and dissimilar materials to be utilized for the mounting brackets 44 and the cross member 46, such as ferrous and non-ferrous metals, plastics, composites, and the like.

Figure 12:
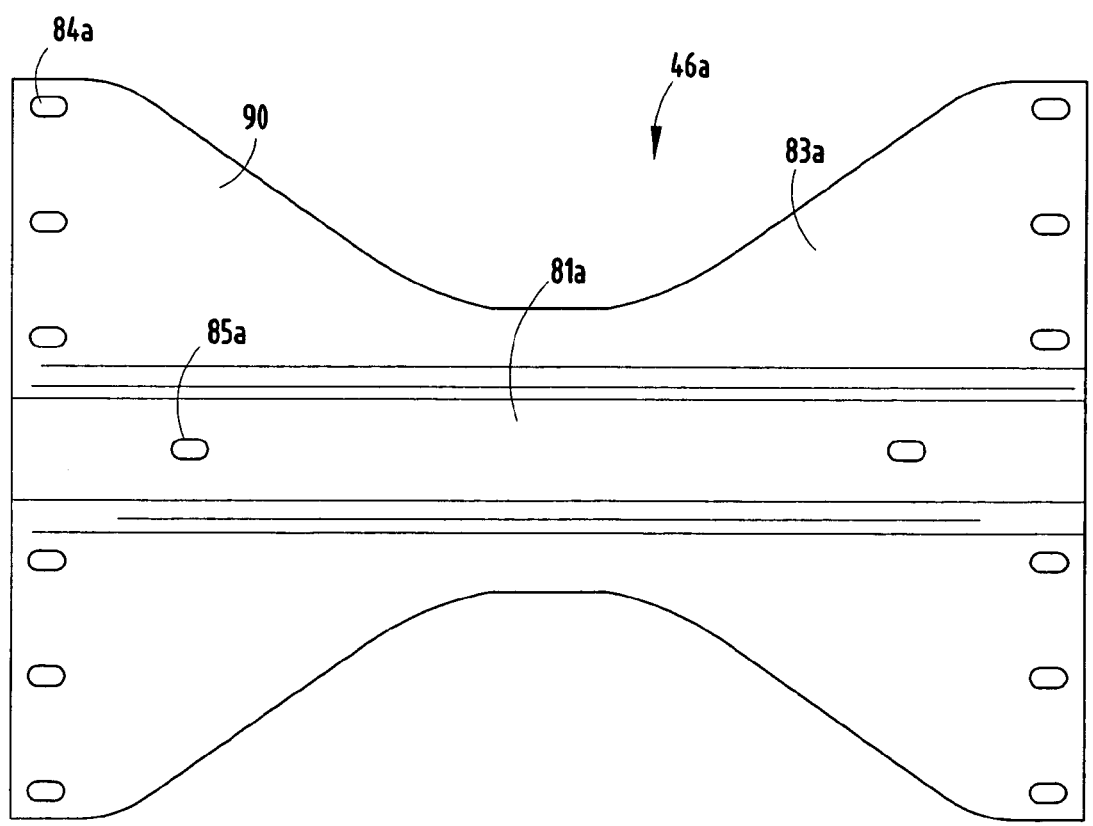
FIG. 12 is a top perspective view of a second embodiment of the cross member.
Figure 13:
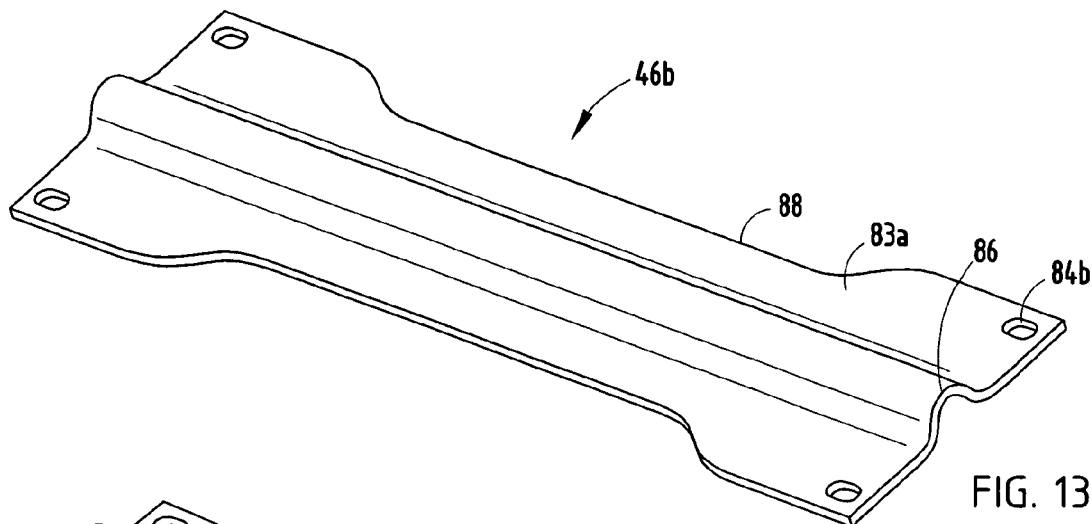
FIG. 13 is a top perspective view of a third embodiment of the cross member.
Figure 14:
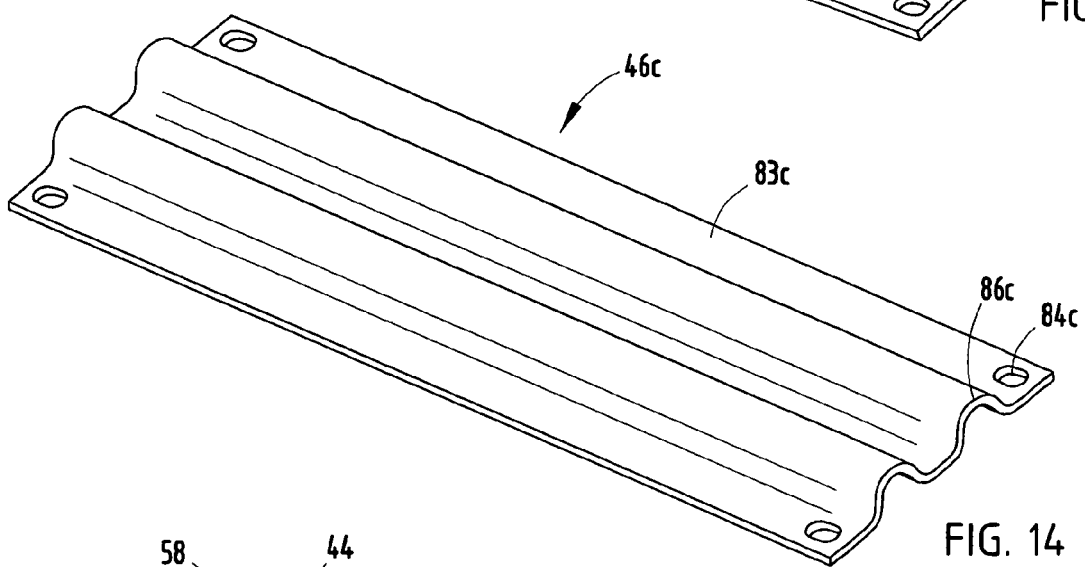
FIG. 14 is a top perspective view of a fourth embodiment of the cross member.

As illustrated in FIGS. 12–14, the cross member 46 be provided with numerous cross-sectional configurations, as well as with various top plan configurations. The cross member 46 of FIG. 8 is provided with a hat-shaped cross-sectional configuration, such as that discussed above. Preferably, the cross member 46a (FIG. 12) includes a pair of outwardly-extending wing portions 90 that are positioned between the mounting wall 64 of the associated mounting bracket 44, thereby increasing the torsional strength of the cross member 46 as well as the racking stability of the overall mounting assembly 40. As best illustrated in FIG. 13, an alternative cross member 46b includes an upwardly-extending and downwardly-opening U-shaped channel 86 extending along the length thereof. The cross member 46b further includes a pair of longitudinally and inwardly-extending recesses or reliefs 88, thereby minimizing the overall weight of the cross member 46b. FIG. 14 illustrates another alternative cross member 46c that includes a pair of laterally-spaced, longitudinally-extending U-shaped channels 83c. It should be noted that other various geometrical configurations of the cross member 46, 46a, 46b, 46c may be utilized to provide a specific weight, or a specific torsional, bending or racking structural rigidity, depending upon the requirements of the particular application. It should be noted that any of the cross-sectional and profile configurations for the cross member 46 and the alternative embodiments thereof may be interchanged with one another to optimize structural rigidity.

Figure 15:
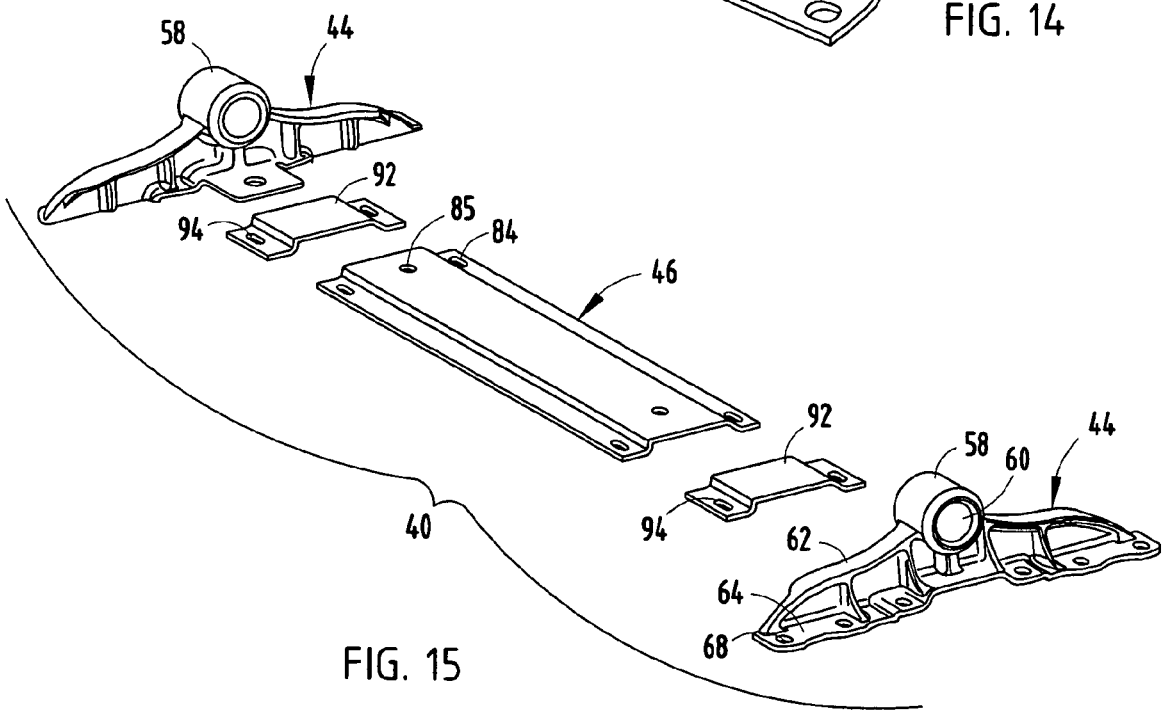
FIG. 15 is an exploded top perspective view of an alternative embodiment of the fifth wheel mounting assembly including a pair of mounting brackets, a cross member, and a pair of dampening members.

As illustrated in FIG. 15, the fifth wheel mounting assembly 40 may alternatively include a flexibly-resilient bushing member 92 located within the recess 82 of each of the mounting brackets 44 and sandwiched between the mounting brackets 44 and the cross member 46. In the illustrated example, the bushing member 92 is provided a cross-sectional configuration that matches the cross-sectional configuration of the cross member 46, and further includes a pair of apertures 94 positioned so as to align with the apertures 84 of the cross member 46 and select apertures 68 of the associated mounting bracket 44. The bushing member 92 is preferably constructed of an elastomer that provides a dampening effect to the torsional and bending forces transferred between the mounting bracket 44 and the cross member 46 during operation of the associated tractor.

Figure 16:
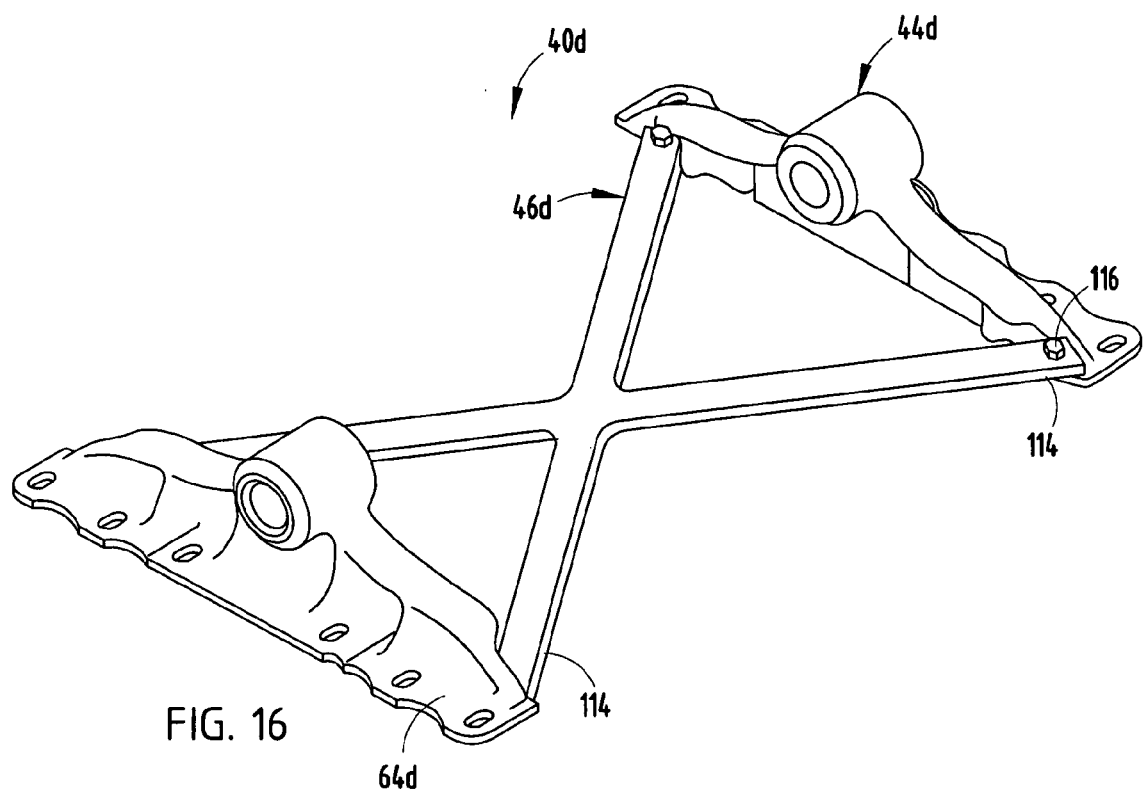
FIG. 16 is a perspective view of another alternative embodiment of the mounting assembly.
Figure 17:
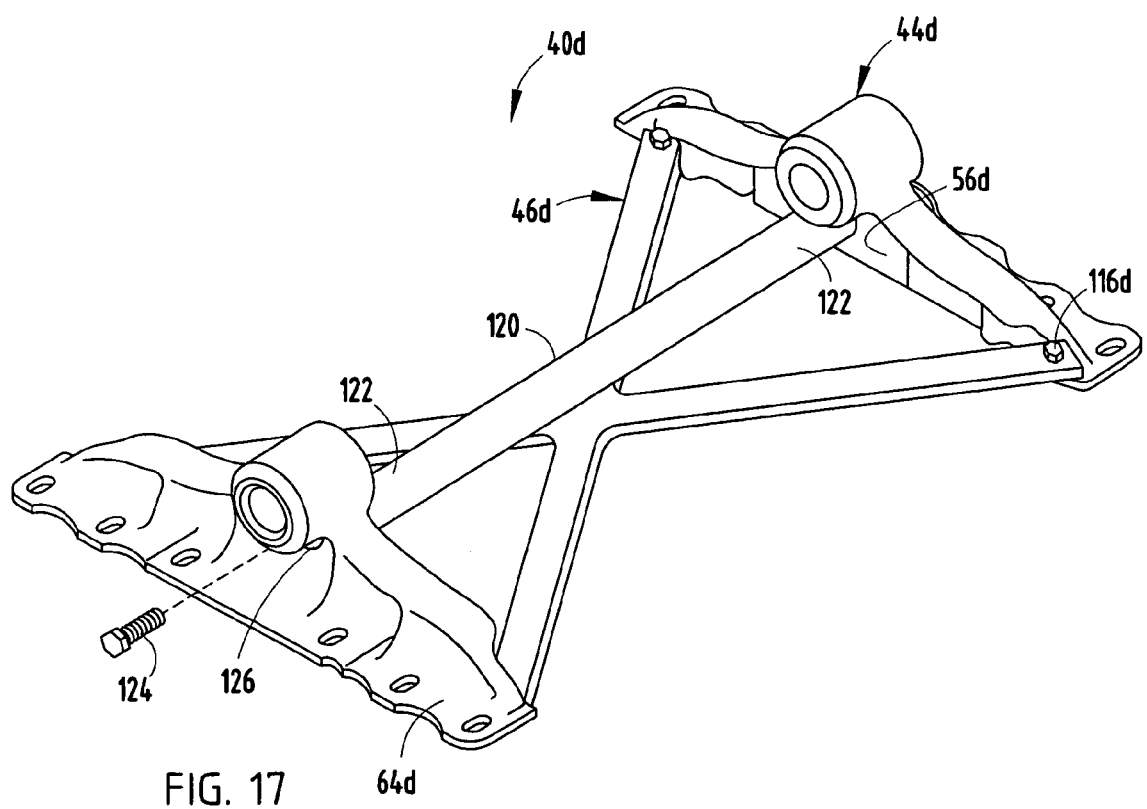
FIG. 17 is a perspective view of another alternative embodiment of the mounting assembly.
Figure 18:
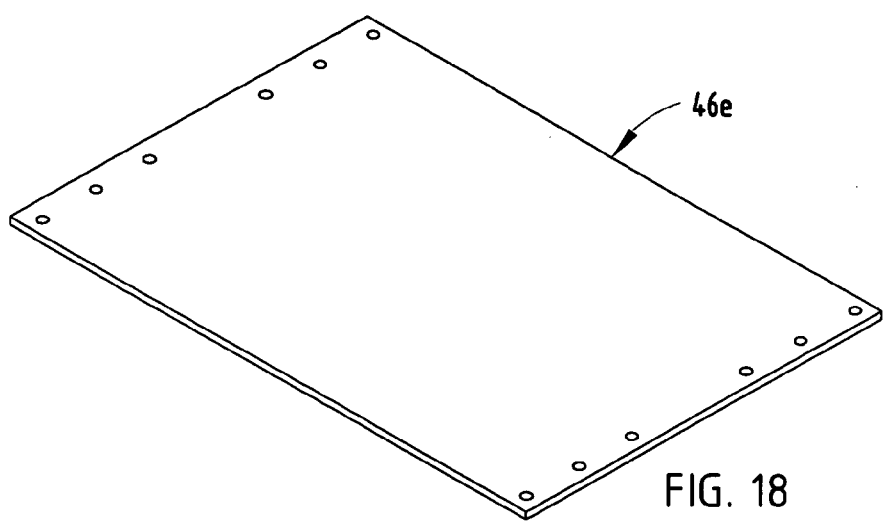
FIG. 18 is a perspective view of another alternative embodiment of the cross member.
Figure 19:
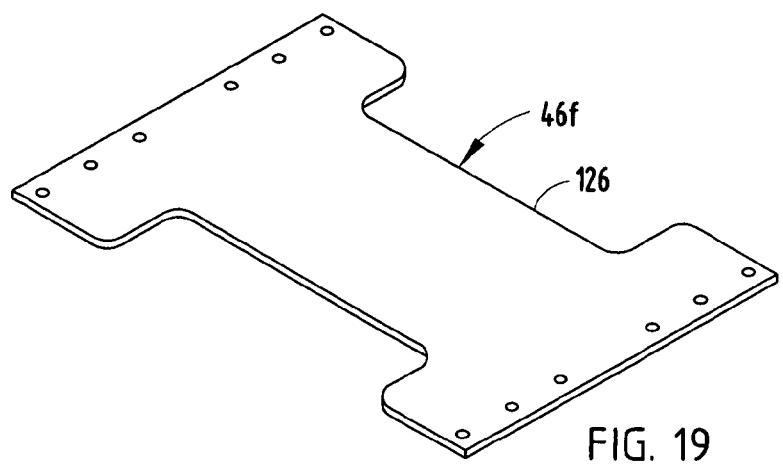
FIG. 19 is a perspective view of another alternative embodiment of the cross member.
Figure 20:
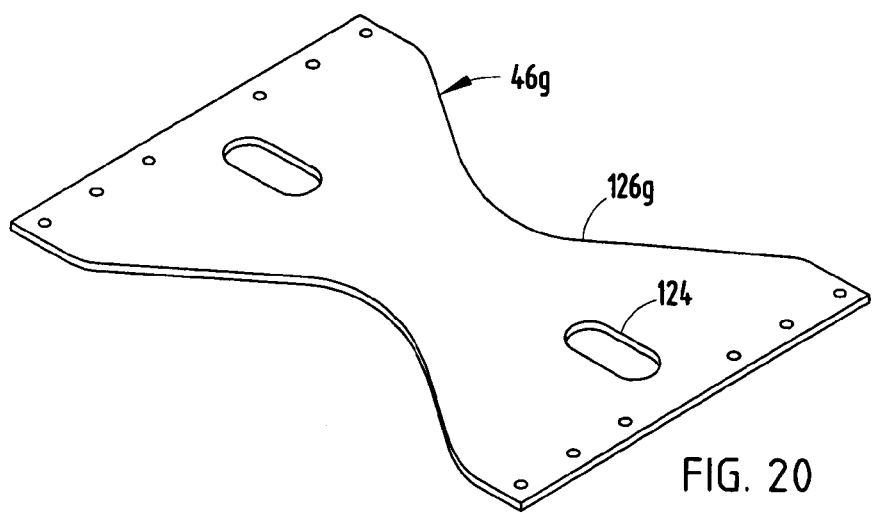
FIG. 20 is a perspective view of another alternative embodiment of the cross member.
Figure 21:
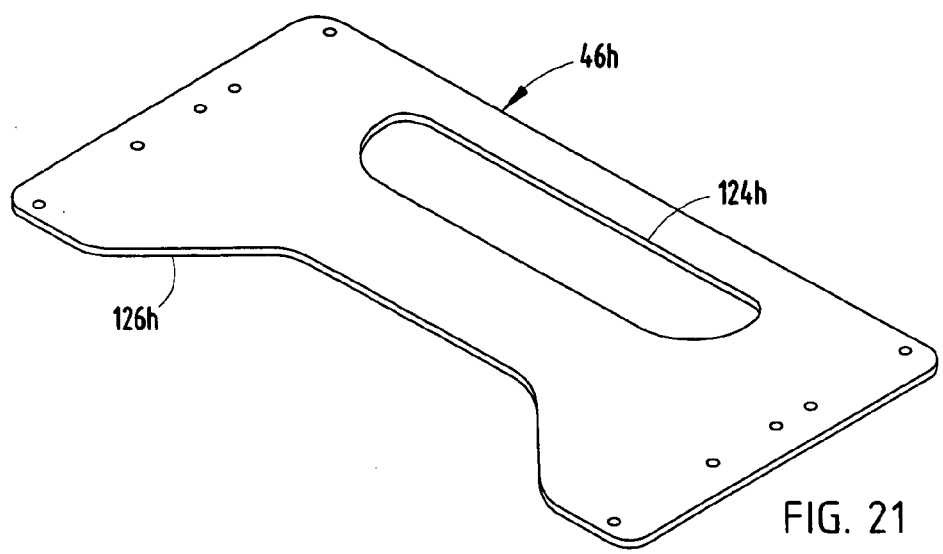
FIG. 21 is a perspective view of another alternative embodiment of the cross member.
Figure 22:
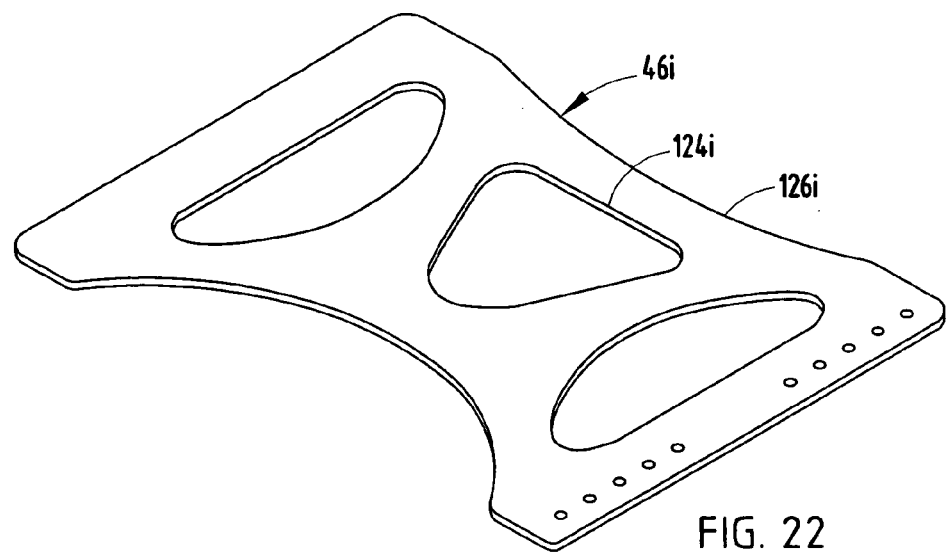
FIG. 22 is a perspective view of another alternative embodiment of the cross member.
Figure 23:
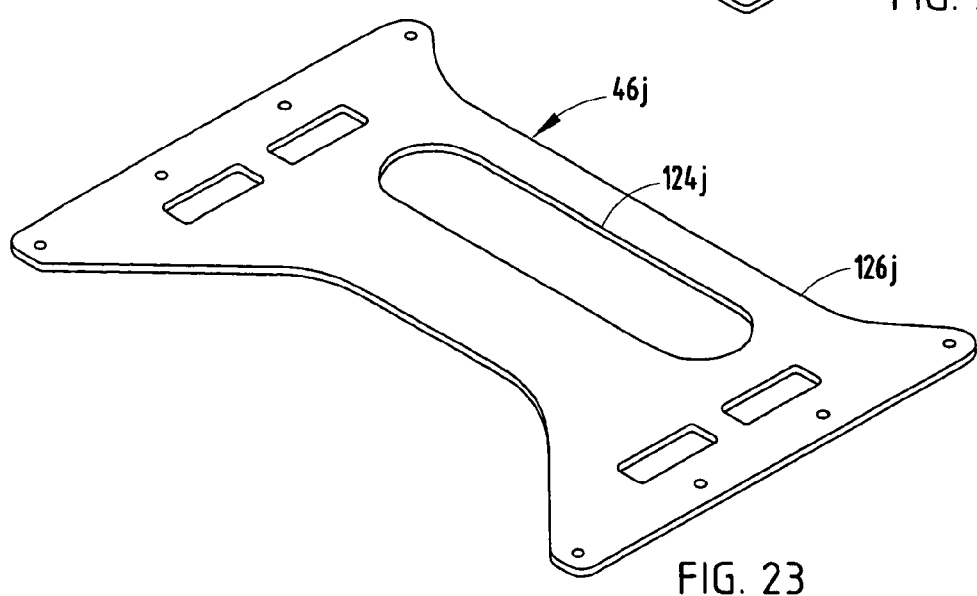
FIG. 23 is a perspective view of another alternative embodiment of the cross member.

The reference numeral 40d (FIG. 16) generally represents another embodiment of the present invention. Since mounting assembly 40d is similar to the previously-described mounting assembly 40, similar parts appearing in FIG. 8 and in FIG. 16 respectively are represented by the same, corresponding reference numeral, except for the suffix "d" in the numerals of the latter. The cross member 46d is provided an X-shape profile configuration and comprises a single piece and is provided a rectangular cross sectional geometry. The cross member 46d includes ends 114 that are affixed to inwardly-extending portions of corresponding mounting walls 64d via mechanical fasteners such as bolts 116. The mounting assembly 40d (FIG. 17) may alternatively further include a central structural support 120 having a circular cross-sectional configuration and ends 122 fixedly coupled to the body portion 56d of each mounting bracket 44d. In the illustrated example, the structural support 120 is fixedly coupled with the mounting brackets 44d by mechanical fasteners such as bolts 124 received within apertures 126 extending through the body portion 56d of each mounting bracket 44d, however, other methods of affixing the structural member 120 to the mounting brackets 44d may be utilized.

It should be noted that the cross member 46 of the mounting assembly 40 may be provided in a plurality of configurations and geometries, as exemplified by cross members 46e–46j, illustrated in FIGS. 18–23. It should be noted that the cross members 46e–46j include a variety of apertures 124, 124h, 124i, 124j and inwardly-extending recesses or reliefs 126, 126g, 126h, 126i, 126j patterned so as to provide both symmetrical as well as asymmetrical. configurations. These configurations may be adjusted so as to maximize the structural rigidity of the associated mounting assembly 40 depending upon the requirements of the particular application.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A fifth wheel mounting assembly for mounting a fifth wheel hitch plate to the frame of a tractor, comprising:
   a first support member adapted to be fixedly coupled to a first rail of a tractor, and having a plurality of first apertures;
   a second support member adapted to be fixedly coupled to a second rail of a tractor, and having a plurality of first apertures;
   a first mounting bracket including a plurality of apertures that receive mounting hardware therein, the mounting hardware extending through the plurality of apertures of the first mounting bracket also extending through the plurality of first apertures of the first support member, thereby fixedly coupling the first mounting bracket with the first support member, the first mounting bracket further including an inwardly exposed aperture adapted to receive a mounting pin therein for pivotably coupling a fifth wheel hitch plate to the first mounting bracket, and a recess;
   a second mounting bracket including a plurality of apertures that receive mounting hardware therein, the mounting hardware extending through the plurality of apertures of the first mounting bracket also extending through the plurality of first apertures of the second support member, thereby fixedly coupling the second mounting bracket with the second support member, the second mounting bracket further including an inwardly exposed aperture adapted to receive a mounting pin therein for pivotably coupling a fifth wheel hitch plate to the second mounting bracket, and a recess; and
   a structural cross member having a first end received within the recess of the first mounting bracket and a second end received within the recess of the second mounting bracket, thereby torsionally coupling the first support member and the first mounting bracket with the second support member and the second mounting bracket.

2. The fifth wheel mounting assembly of claim 1, wherein the recess of the first mounting bracket is located on a bottom surface of the first mounting bracket, and wherein the recess of the second mounting bracket is located on a bottom surface of the second mounting bracket.

3. The fifth wheel mounting assembly of claim 2, wherein the first end of the cross member is sandwiched between the first support member and the first mounting bracket, and wherein the second end of the cross member is sandwiched between the second support member and the second mounting bracket.

4. The fifth wheel mounting assembly of claim 3, wherein the cross member includes a corrugated cross-sectional configuration.

5. The fifth wheel mounting assembly of claim 4, wherein the cross member includes a hat-shaped cross-sectional configuration.

6. The fifth wheel mounting assembly of claim 5, wherein the cross member includes a tapered mid-section.

7. The fifth wheel mounting assembly of claim 1, wherein the first support member and the second support member each include a substantially L-shaped cross-sectional configuration.

8. The fifth wheel mounting assembly of claim 1, further including:
   at least one bushing member sandwiched between the cross member and each mounting bracket.

9. The fifth wheel mounting assembly of claim 1, wherein the first end of the cross member is sandwiched between the first support member and the first mounting bracket, and wherein the second end of the cross member is sandwiched between the second support member and the second mounting bracket.

10. The fifth wheel mounting assembly of claim 1, wherein the cross member includes a corrugated cross-sectional configuration.

11. The fifth wheel mounting assembly of claim 10, wherein the cross member includes a hat-shaped cross-sectional configuration.

12. The fifth wheel mounting assembly of claim 1, wherein the cross member includes a tapered mid-section.

13. The fifth wheel mounting assembly of claim 1, wherein the cross member includes an X-shape.

14. The fifth wheel mounting assembly of claim 13, wherein the cross member includes a rectangularly-shaped cross-sectional configuration.

15. The fifth wheel mounting assembly of claim 13, further including:
a second structural cross member extending between the first and second mounting brackets and coupled thereto.

16. The fifth wheel mounting assembly of claim 15, wherein the second structural cross member is centrally located with respect to the first and second mounting brackets and includes a circular cross-sectional configuration.

17. The fifth wheel mounting assembly of claim 1, wherein the structural cross member comprises a plate including at least one vertically-extending aperture extending therethrough.

18. A fifth wheel hitch assembly for coupling a trailer to a tractor, comprising:
a hitch plate defining a throat adapted to receive a kingpin, and including a pair of mounting apertures;
at least one mounting pin received within the mounting apertures of the hitch plate; and
a fifth wheel mounting assembly, comprising:
a first support member adapted to be fixedly coupled to a first rail of a tractor, and a plurality of first apertures;
a second support member adapted to be fixedly coupled to a second rail of a tractor, and a plurality of first of apertures;
a first mounting bracket including a plurality of apertures that receive mounting hardware therein, the mounting hardware extending through the plurality of apertures of the first mounting bracket also extending through the plurality of first apertures of the first support member, thereby fixedly coupling the first mounting bracket with the first support member, the first mounting bracket further including an inwardly exposed aperture receiving the at least one mounting pin therein, thereby pivotably coupling the fifth wheel hitch plate to the first mounting bracket, and a recess;
a second mounting bracket including a plurality of apertures that receive mounting hardware therein, the mounting hardware extending through the plurality of apertures of the first mounting bracket also extending through the plurality of first apertures of the second support member, thereby fixedly coupling the second mounting bracket with the second support member, the second mounting bracket further including an inwardly exposed aperture receiving the at least one mounting pin therein, thereby pivotably coupling the fifth wheel hitch plate to the second mounting bracket, and a recess; and
a structural cross member having a first end received within the recess of the first mounting bracket and a second end received within the recess of the second mounting bracket, thereby torsionally coupling the first support member and the first mounting bracket with the second support member and the second mounting bracket.

19. The fifth wheel hitch assembly of claim 18, wherein the recess of the first mounting bracket is located on a bottom surface of the first mounting bracket, and wherein the recess of the second mounting bracket is located on a bottom surface of the second mounting bracket.

20. The fifth wheel hitch assembly of claim 19, wherein the first end of the cross member is sandwiched between the first support member and the first mounting bracket, and wherein the second end of the cross member is sandwiched between the second support member and the second mounting bracket.

21. The fifth wheel hitch assembly of claim 20, wherein the cross member includes a corrugated cross-sectional configuration.

22. The fifth wheel hitch assembly of claim 21, wherein the cross member includes a hat-shaped cross-sectional configuration.

23. The fifth wheel hitch assembly of claim 22, wherein the cross member includes a tapered mid-section.

24. The fifth wheel hitch assembly of claim 18, wherein the first support member and the second support member each include a substantially L-shaped cross-sectional configuration.

25. The fifth wheel hitch assembly of claim 18, wherein the fifth wheel mounting assembly further includes at least one bushing member sandwiched between the cross member and each mounting bracket.

26. The fifth wheel hitch assembly of claim 18, wherein the first end of the cross member is sandwiched between the first support member and the first mounting bracket, and wherein the second end of the cross member is sandwiched between the second support member and the second mounting bracket.

27. The fifth wheel hitch assembly of claim 18, wherein the cross member includes a corrugated cross-sectional configuration.

28. The fifth wheel hitch assembly of claim 27, wherein the cross member includes a hat-shaped cross-sectional configuration.

29. The fifth wheel hitch assembly of claim 18, wherein the cross member includes a tapered mid-section.

30. The fifth wheel hitch assembly of claim 18, wherein the cross member includes an X-shape.

31. The fifth wheel hitch assembly claim 30, wherein the cross member includes a rectangularly-shaped cross-sectional configuration.

32. The fifth wheel hitch assembly of claim 30, further including:
a second structural cross member extending between the first and second mounting brackets and coupled thereto.

33. The fifth wheel hitch assembly of claim 32, wherein the second structural cross member is centrally located with respect to the first and second mounting brackets and includes a circular cross-sectional configuration.

34. The fifth wheel hitch assembly of claim 18, wherein the structural cross member comprises a plate including at least one vertically-extending aperture extending therethrough.

* * * * *